United States Patent [19]

Weidinger et al.

[11] Patent Number: 5,701,238
[45] Date of Patent: Dec. 23, 1997

[54] FLOW-THROUGH DC VOLTAGE CHANGER HAVING A FURTHER OUTPUT CIRCUIT

[75] Inventors: Marc Weidinger, Munich; Karl-Heinz Kramer, Wolfratshausen, both of Germany

[73] Assignee: Siemens Aktiengesellschaft, Munich, Germany

[21] Appl. No.: 775,381

[22] Filed: Dec. 30, 1996

Related U.S. Application Data

[63] Continuation of Ser. No. 509,902, Aug. 1, 1995, abandoned.

[30] Foreign Application Priority Data

Aug. 1, 1994 [EP] European Pat. Off. ............ 94111983

[51] Int. Cl.$^6$ .......................... H02M 3/335; H02M 3/18; H02M 7/25
[52] U.S. Cl. .................... 363/21; 363/16; 363/59
[58] Field of Search .................... 363/21, 59, 60, 363/61, 16

[56] References Cited

U.S. PATENT DOCUMENTS

| | | | |
|---|---|---|---|
| 3,737,758 | 6/1973 | Allington | 321/18 |
| 4,323,961 | 4/1982 | Josephson | 363/56 |
| 4,559,594 | 12/1985 | Sears et al. | 363/126 |
| 4,727,463 | 2/1988 | Suzuki | 363/21 |
| 4,785,387 | 11/1988 | Lee et al. | 363/21 |
| 5,249,113 | 9/1993 | Perol | 363/24 |
| 5,331,532 | 7/1994 | Iwai et al. | 363/20 |
| 5,408,402 | 4/1995 | Nonnenmacher | 363/21 |

FOREIGN PATENT DOCUMENTS

| | | |
|---|---|---|
| 3912849 | 11/1989 | Germany . |
| 4021385 | 1/1992 | Germany . |
| 4118918 | 12/1992 | Germany . |

OTHER PUBLICATIONS

J. Wüstehube, "Schaltnetzteile: Grundlagen, Entwurf, Schaltungsbeispiele" 1982, Expert Verlag, pp. 474–483.
R. Köstner et al., "Elektronische Schaltungstechnik", Dr. A. Hüthig Verlag, Heidelberg, 1982, pp. 43–45.

*Primary Examiner*—Stuart N. Hecker
*Assistant Examiner*—Bao Q. Vu
*Attorney, Agent, or Firm*—Hill, Steadman & Simpson

[57] ABSTRACT

A flow-through DC voltage changer having an electronic switch in the primary-side main circuit and having a further output circuit that absorbs energy in the blocking phase of the flow-through DC voltage changer. An arrangement having two diodes and two capacitors is connected to the secondary winding of the transformer for supplying an electronic circuit with an auxiliary voltage that is higher compared to the output voltage. The flow-through DC voltage changer is especially suitable for supplying ASICs.

11 Claims, 2 Drawing Sheets

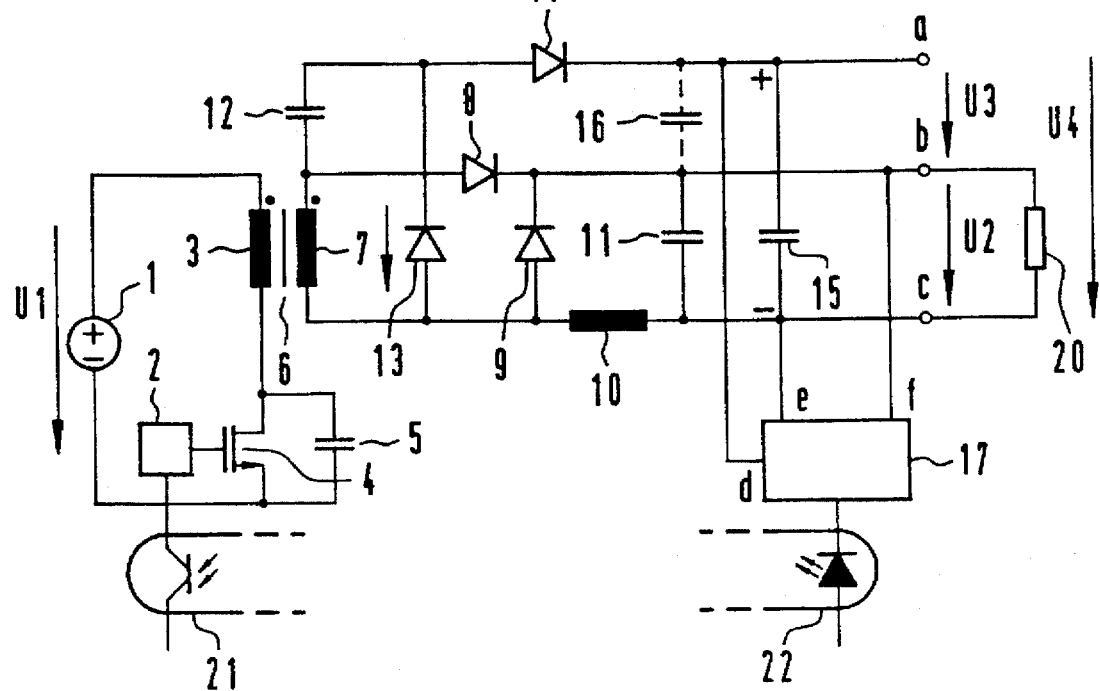
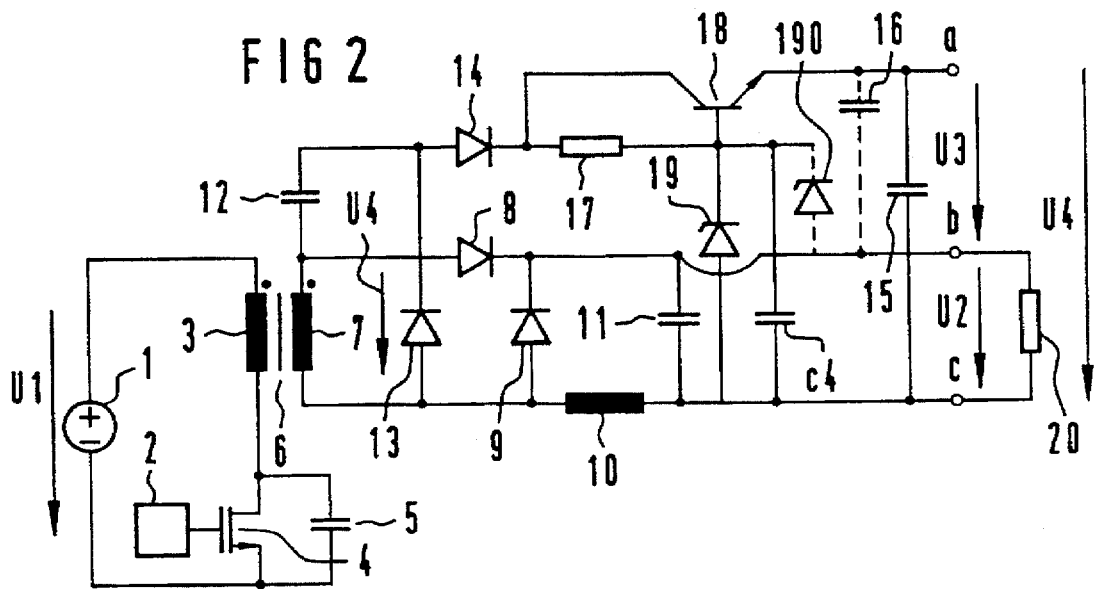

FLOW-THROUGH DC VOLTAGE CHANGER HAVING A FURTHER OUTPUT CIRCUIT

This is a continuation of application Ser. No. 08/509,902, filed Aug. 1, 1995 now abandoned.

BACKGROUND OF THE INVENTION

1. Field of the Invention

The present invention is directed, in general, to a flow-through DC voltage changer and, in particular, to a voltage changer having an electronic switch at the primary-side main circuit of a transformer and having a secondary-side main circuit and a further output circuit connected to the secondary winding of the transformer.

2. Description of the Related Art

Such a flow-through DC voltage changer is already known from the book by Joachim Wuestehube, "Schaltnetzteile: Grundlagen, Entwurf, Schaltungsbeispiele", expert-verlag, 1982, pages 474 through 483.

The known flow-through DC voltage changer is part of a switched regulator that comprise three blocking voltage changers and a flow-through DC voltage changer output circuit. A power switch is provided in the main circuit at the primary side of the transformer, the power switch being controlled by one of the blocking voltage changer output circuits for the purpose of maintaining a constant blocking voltage changer output voltage. The flow-through DC voltage changer output circuit contains a readjustment means. The re-adjustment means requires a supply voltage that is higher than the output voltage of the flow-through DC voltage changer output circuit. The supply voltage is generated with the assistance of one of the blocking voltage changer output circuits. The appertaining output circuit is connected to its own secondary winding, so that the supply voltage can be connected to the flow-through DC voltage changer output circuit with the desired polarity.

In the German Patent Document DE 40 21 385 C2, FIG. 3 also discloses a blocking voltage changer that comprises an additional flow-through DC voltage changer output circuit. The output voltage of the blocking voltage changer is regulated to a constant value with the assistance of a power switch arranged in the main circuit at the primary side of the transformer. A readjustment means is provided in the flow-through DC voltage changer output circuit. The supply voltage required for the readjustment means is acquired with the assistance of a rectifier circuit. The rectifier circuit rectifies the voltage adjacent to the rectifier diode in the blocking phase of the flow-through DC voltage changer output circuit. The supply voltage that is acquired in this way is directed opposite the output voltage of the flow-through DC voltage changer output circuit.

In the publication by Roland Koestner and Albrecht Moeschwitzer, "Elektronische Schaltungstechnik", Dr. Alfred Huethig Verlag Heidelberg, 1987, on pages 42 through 45, also discloses a circuit for voltage doubling with whose assistance a DC voltage can be acquired from an alternating voltage, this DC voltage being equal to twice the peak value of the alternating voltage. Given this single-stage cascade circuit, a capacitor is connected to the alternating voltage source via a diode. The junction between the diode and the capacitor is conducted via a further diode to a further capacitor at which double the peak voltage is available.

SUMMARY OF THE INVENTION

An object of the invention is to provide a primarily clocked flow-through DC voltage changer with a regulated output voltage such that an auxiliary voltage having the polarity of the output voltage is available without thereby requiring an additional secondary winding at the transformer. In particular, the auxiliary voltage should be optimally independent of changes in the input voltage.

Considerations within the framework of the present invention have shown that a half-wave of a sine voltage is available from the input of the main circuit to the output side during the blocking phase given a flow-through DC voltage changer that comprises a demagnetization resonant circuit. The amplitude of the sine voltage is practically independent of the input voltage, and that its voltage can be added to the output voltage of the flow-through DC voltage changer with comparatively little outlay.

According to the present invention, the flow-through DC voltage changer as described above has a first capacitor of the further output circuit connected to a junction of the secondary winding with a rectifier diode of the secondary-side main circuit; and, in the further output circuit, a second diode that is connected so as to be polarized in the conducting direction with reference to the voltage applied to the capacitor is arranged between the connection of the rectifier diode to the capacitor, on the one hand, and the output, on the other hand.

In formal terms, the further output circuit is similar in some respects to a voltage doubling circuit. If the rectifier diode of the main circuit at the secondary side is conductive, however, the DC voltage that is previously obtained in the demagnetization phase is placed onto the output voltage of the flow-through DC voltage changer.

The inventive measures advantageously yield a flow-through DC voltage changer wherein both a comparatively low, regulated output voltage for a relatively high load current as well as an auxiliary voltage that is higher in comparison thereto and is largely independent of the input voltage and has a comparatively low current consumption are generated from the secondary voltage of the transformer with especially little outlay and with great dependability.

Advantageous developments of the invention provide that the flow-through DC voltage changer has the output voltage of the flow-through DC voltage changer regulated to a constant value with the assistance of the electronic switch which is controllable by the control means. A capacitor is connected in series with the output of the flow-through DC voltage changer, one terminal of the capacitor being connected to that terminal of the flow-through DC voltage changer output that carries a voltage compared to the reference potential and the other terminal thereof being conducted to that terminal of a second diode facing away from the first diode. Acceding to a preferred embodiment, a capacitor whose one terminal is connected to the reference potential and whose other terminal is conducted to that terminal of the second diode facing away from the first diode lies at the output of the flow-through DC voltage changer.

As a further development, the collector-emitter path of a transistor is connected between the second diode and the output of the further output circuit, and a zener diode is connected between the base of the transistor and a reference potential. A resistor is connected between the collector and the base of the transistor.

In operation, one embodiment provides that the output voltage of the flow-through DC voltage changer is lower than 5 volts and the auxiliary voltage amounts to at least 5 volts.

The flow-through DC voltage changer also contains circuitry connected to the secondary circuit, the supply voltage input of the circuitry being connected to the output of the further output circuit.

In the flow-through DC voltage changer, the core of the transformer is an air gap.

BRIEF DESCRIPTION OF THE DRAWINGS

The invention shall be set forth in greater detail with reference to exemplary embodiments shown in the figures.

3

Figure 3:
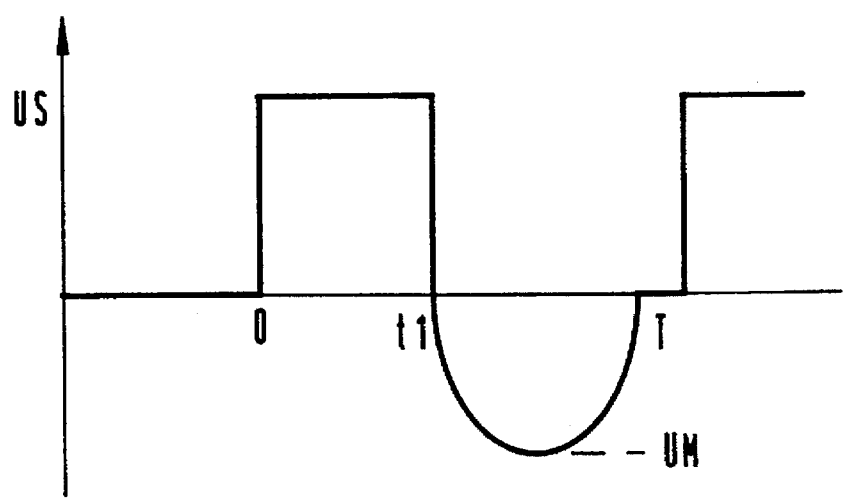

FIG. 1 is a circuit diagram of a flow-through DC voltage changer having a blocking voltage changer output circuit for generating a supply voltage for a regulating circuit according to the principles of the present invention;

FIG. 2 is a circuit diagram of a flow-through DC voltage changer having a stabilization circuit in the blocking voltage changer output circuit;

FIG. 3 is a voltage diagram for a standard flow-through DC voltage changer; and

Figure 4:
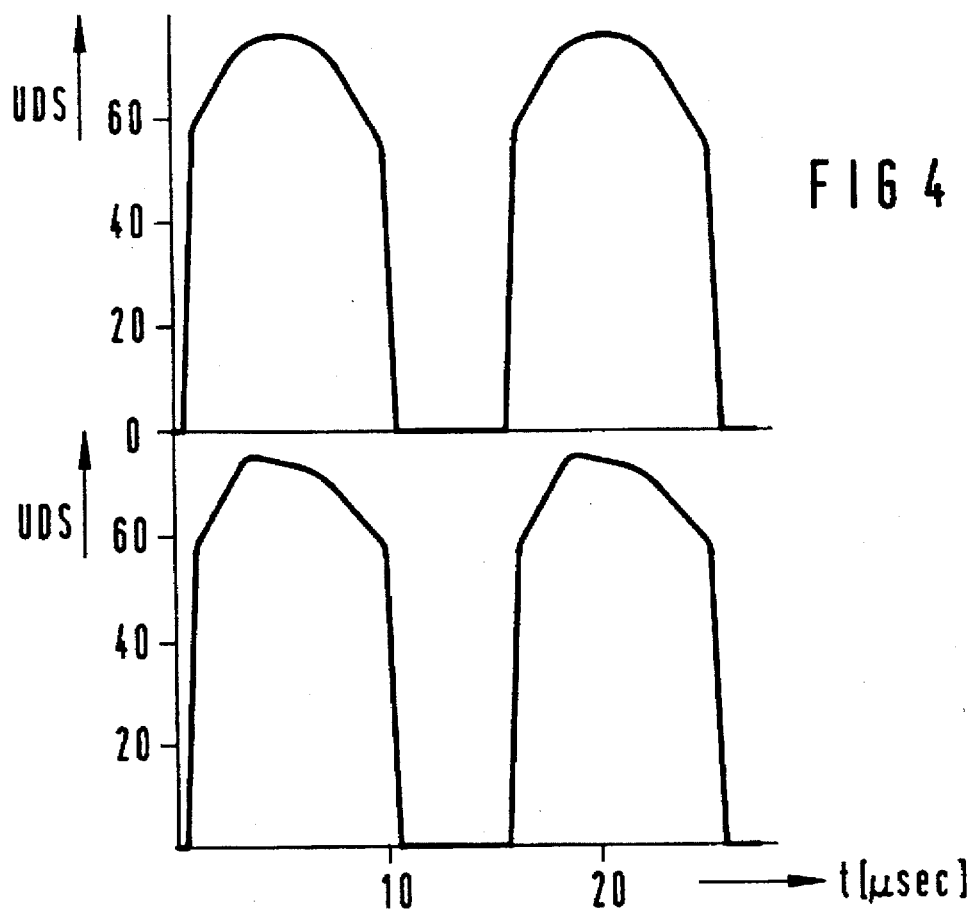

FIG. 4 is a voltage diagram for the flow-through DC voltage changer of FIG. 1 or FIG. 2.

DETAILED DESCRIPTION OF THE PREFERRED EMBODIMENTS

Given the circuit arrangement shown in FIG. 1, the electrical user, or load, 20 lies at the output b and c of the primarily clocked single-ended flow-through DC voltage changer. The user 20, in particular, is an ASIC, i.e. a user-specific integrated circuit, that requires a supply voltage below 5 volts.

The primary-side main circuit is connected to the DC voltage source 1 and proceeds from the input for the DC voltage U1 via the primary winding 3 of the transformer 6 and the electronic circuit 4 that is connected in series therewith. The electronic switch 4 is a field effect transistor which serves as a power switch. A capacitor 5 is connected in parallel to the drain-source path of the field effect transistor 4.

The secondary-side main circuit proceeds from an end of the secondary winding 7 of the transformer 6 via the rectifier diode 8 to the output terminal b. The freewheeling diode 9 is connected in a shunt arm that follows the rectifier diode 8. The inductor 10 is located between the other end of the secondary winding 7 and the output terminal c. The storage capacitor 11 at which the DC voltage U2 appears is located in a shunt arm following the inductor 10.

The electronic switch 4 is periodically activated with turn-on pulses with the assistance of the clock-controlled control means 2 and forms the actuator of a controlled system. The pulse-duty factor of the control voltage that controls the electronic switch 4 is limited to a predetermined, upper limit value. The upper limit value of the pulse-duty factor of the control voltage preferably amounts to approximately 0.5. As used herein, the pulse-duty factor is the ratio of the pulse duration to the period duration.

The output voltage U2 is regulated to a constant value with the assistance of a regulating arrangement 17. The regulating arrangement 17 has an actual value input connected to the output b and c of the flow-through DC voltage changer. The control means 2 is driven by the regulating arrangement 17 via an opto-coupler 21 and 22.

In view of the finite voltage drop-off at the light-emitting diode 22 of the opto-coupler 21 and 22 that cannot be left out of consideration and taking the supply voltage that is required, particularly by the regulator formed by an operational amplifier, into consideration, the output voltage U2 of the flow-through DC voltage changer is not adequate as an auxiliary voltage for the regulating arrangement 17.

In addition to the secondary-side main circuit, a rectifier circuit is also connected to the secondary winding 7 of the transformer 6. This rectifier circuit contains the rectifier diode 13, which serves as a half-wave rectifier, and the smoothing capacitor 12. The one terminal of the capacitor 12 is connected to the terminal of the secondary winding at which the rectifier diode 8 of the secondary-side main circuit lies. The other terminal of the capacitor 12 is conducted via the rectifier diode 14 to the terminal a so that the terminal a

4 is at the auxiliary output voltage when compared to the reference potential at terminal c.

The auxiliary voltage U4 is formed by the addition of the regulated output voltage U2 and the voltage U3. The voltage at the capacitor 15 is the rectified secondary voltage minus the voltage at the inductor 10 and the voltage at the rectifier diodes 13 and 14. The demagnetization voltage that is diminished by the diode voltages is, thus, obtained as the voltage at the capacitor 15.

The capacitor 15 lies between the terminal a and the terminal c, which is at reference potential. The capacitance of the capacitor 15 is preferably significantly less than the capacitance of the capacitor 11. It, thus, follows that the auxiliary voltage U4 is built up to a higher level earlier than the output voltage U2 to be regulated. The early supply of the regulating arrangement 17 at the beginning of the regulating event as well as an adequate voltage reserve for the regulation are thus assured. The comparatively high auxiliary voltage U4 also enables independent and defined regulator properties.

The auxiliary voltage can potentially additionally or alternatively serve for feeding other electronics, particularly a surveillance means.

The capacitor 16 that lies between the terminals a and b can potentially replace the capacitor 15. What is thereby advantageous is that the storage capacitor 11 of the secondary-side main circuit is co-utilized as part of a capacitance lying at the output of the rectifier circuit, in that the alternating current part of the auxiliary voltage U4 is diverted to the reference potential via the series circuit of the capacitors 16 and 11.

The auxiliary voltage input d and e of the regulating arrangement 17 lies at the output a and c of the rectifier circuit.

The flow-through DC voltage changer shown in FIG. 2 is largely similar to that of FIG. 1. As a difference, the rectifier circuit is augmented by a stabilization circuit.

FIG. 2 shows a flow-through DC voltage changer wherein, corresponding to FIG. 1, a device for generating the auxiliary voltage U4 is connected to the secondary winding 7 of the transformer 6 in addition to the secondary-side main circuit. The rectifier diode 8 has its anode lying at the start of the secondary winding 7. The free-wheeling diode 9 lies between the cathode of the rectifier diode 8 and the end of the secondary winding 7. The inductor 10 lies between the anode of the free-wheeling diode 9 and the terminal c for the reference potential. In a departure from the circuit of FIG. 1, the inductor can potentially lie in the other series arm of the secondary-side main circuit.

The device for generating the auxiliary voltage U4 contains a device for voltage stabilization. This device for voltage stabilization contains an arrangement having the bipolar transistor 18. The npn transistor 18 has its collector connected to the cathode of the diode 14, its emitter connected to the capacitor 15 and its base connected to the cathode of the zener diode 19. The anode of the zener diode 19 lies at the terminal c for the reference potential. The resistor 17 lies between the base and the collector of the transistor 18. The terminal of the capacitor 15 facing away from the emitter of the transistor 18 lies at ground.

The capacitor 16 can potentially replace the capacitor 15, which then is connected between the emitter of the transistor 18 and the terminal be for the output voltage U2.

The peak value of the voltage that occurs in the inhibit phase by the flow-through DC voltage changer at the secondary winding 7 is largely independent of the DC voltage U1. The capacitor 12 charges to this peak value within an inhibited rectifier diode 8. The constant auxiliary voltage U4 is acquired from the voltage at the capacitor 12 with the assistance of the stabilization circuit 17, 18 and 19. The auxiliary voltage U4 derives as the sum of the constant output voltage U3, of the zener voltage of the zener diode 19, and of the base-emitter threshold voltage of the transistor 18.

In a modification of the flow-through DC voltage changer of FIG. 2, the zener diode 190 can potentially replace the zener diode 19. The zener diode 190 then lies between the base of the transistor 18 and the terminal b for the output voltage U2 and, corresponding to the output voltage U2, has a lower zener voltage than the zener diode 19.

Given the flow-through DC voltage changer of FIG. 2, the terminal b for the output voltage U3 carries a positive potential compared to ground. A flow-through DC voltage changer for generating an auxiliary voltage U4 for negative output voltages U3 derives in that all diodes including the zener diode 19 or, respectively, 190 are connected opposite the polarity of the voltage, and a transistor 18 of the type pnp is selected.

The demagnetization of the transformer is assured via the capacitor 5 that forms a resonant circuit with the inductance of the primary winding. The transformer 6 comprises no additional demagnetization winding. The capacitor 5 is preferably part of a standard RCD wiring at the electronic switch 4. Deviating therefrom, the transformer can be demagnetized at the secondary side, preferably with the assistance of a capacitor connected in parallel to the rectifier diode. Another possibility for the demagnetization is comprised therein that demagnetization is carried out both at the primary side as well as at the secondary side. A demagnetization having an auxiliary winding clamped to the input voltage would prevent the creation of the demagnetization arc that is a prerequisite for the function of the additional output circuit.

The voltage adjacent at the secondary side of the transformer at the secondary winding 7 is shown in FIG. 3. During the transmission phase of the electronic switch 4, the transformed input voltage is across the secondary winding 7; and the transformed demagnetization voltage UM is across the secondary winding during the involuted phase.

The control circuit 2 controls the electronic switch 4 with width-modulated turn-on pulses. The pulse width t1 of the turn-on pulses is modified with this pulse-width modulation. The turn-on duration t1 preferably varies in the range from (0 ... 0.5)T, whereby T is the period duration of the turn-on pulses.

The following approximately applies for the output voltage U2 of the flow-through DC voltage changer:

$$U2=t1 \cdot US=t1 \cdot ü \cdot UE,$$

whereby

ü is the winding ratio of the quotient of number of secondary winding turns and number of primary winding turns and number of primary winding turns, and US is the transformed input voltage.

The transformed demagnetization voltage is exploited for generating the auxiliary voltage U4. The inductance of the primary winding 3 of the transformer and the capacitance of the capacitor 5 form a resonant circuit. This leads to a sinusoidal demagnetization voltage.

The following is valid for the demagnetization:

$$\int_0^{t1} U1(t) \cdot dt = \int_{t1}^T UM(t) \cdot dt$$

The height of the demagnetization arc is thus independent of the input voltage U1 since the voltage/time area remains the same. The turn-on time t1 becomes shorter given a higher input voltage U1. The width of the demagnetization arc is established by the resonant circuit constant L3·C5 whereby L3 is the primary inductance of the transformer and C5 is the capacitance of the capacitor 5.

The peak value UMS of the demagnetization voltage UM is calculated as $$UMS=U1/(4 \cdot f \cdot \sqrt{L3 \cdot C5}),$$

whereby f is the switching frequency.

Energy is withdrawn from the transformer 6 in the demagnetization phase. The magnetic energy EM stored in the transformer 6 is referenced with I as the maximum primary current.

$$EM=½ \cdot L3 \cdot I_2$$

with $$I=(UE/L) \cdot d \cdot T,$$

$$EM=½ \cdot (U1_2/L) \cdot d_2 \cdot T_2,$$ derives, whereby d is the pulse width $d \cdot T=t1$, T is the period duration, U1 is the input voltage.

When the magnetic energy EM is divided by the period duration, the power PM is obtained:

$$PM=EM/T=½ \cdot (U1_2/L) \cdot d_2 \cdot T.$$

In a preferred dimensioning example, the input voltage U1=40 volts, d=0.4, the primary transformer inductance L3=1 mH and the period duration T=16.6 μs are valid. P=2.1 W results therefrom.

When internal losses are also taken into consideration, then approximately 70 through 80% of this energy can be taken at the output a and c of the further output circuit. 25% of the maximum energy is still typically available in no-load operation.

When more energy is required for the auxiliary voltage U4, then the magnetic energy stored in the transformer is increased. This is achieved by looping a correspondingly dimensioned air gap in, as a result whereof the primary inductance L3 is reduced in size.

When energy is withdrawn from the transformer in the blocking phase, then the demagnetization arc of FIG. 3 is capped. The upper part of FIG. 4 shows the demagnetization arc for the case of a lack of a load of the additional output circuit and the lower part therein shows the capped demagnetization curve when the additional output circuit is loaded. The voltage load of the transistor 17 is thus reduced.

Given an output voltage U2=5V, the auxiliary voltage U4 amounts to approximately 17 volts; it amounts to approximately 10 volts given an output voltage U2=3V.

The flow-through DC voltage changers shown in FIGS. 1 and 2 are preferably dimensioned such that the output voltage U3 is respectively lower than 5 volts and the auxiliary voltage U4 respectfully amounts to at least 5 volts.

Although other modifications and changes may be suggested by those skilled in the art, it is the intention of the inventors to embody within the patent warranted hereon all changes and modifications as reasonably and properly come within the scope of their contribution to the art.

We claim:

1. A flow-through DC voltage changer, comprising:
   a transformer having only a primary winding and a secondary winding;
   a primary side main circuit connected to said primary winding of said transformer, said primary side winding having an input at which is applied input voltages, said primary side main circuit including:
   an electronic switch connected in series with said primary winding of said transformer;

a capacitance connected across said electronic switch to provide a demagnetization energy in conjunction with said primary winding;

a control means connected for controlling said electronic switch;

a secondary-side main circuit connected to said secondary winding of said transformer, said secondary-side main circuit having an output at which is available a main output voltage, said secondary side main circuit including:

a rectifier diode connected in a series arm, a freewheeling diode connected in a shunt arm, an inductor connected in a series arm and a capacitor lying parallel to the output, a further output circuit in addition to said secondary-side main circuit being connected to said secondary winding of said transformer, said further output circuit having an auxiliary output at which is available an auxiliary output voltage, said auxiliary output voltage being substantially independent of changes in the input voltage, said further output circuit including a first capacitor, a rectifier diode connected between said first capacitor and said secondary winding, and a capacitor arrangement connected in parallel to an output of said further output circuit and said further output circuit taking demagnetization energy from said transformer in a blocking phase of said flow-through DC voltage changer, said first capacitor of said further output circuit being connected to a junction of said secondary winding with said rectifier diode of said secondary-side main circuit; and in the further output circuit, a second diode polarized in a conducting direction with reference to a voltage across the first capacitor is connected between the connection of said rectifier diode to the capacitor on one hand and said output on another hand.

2. A flow-through DC voltage changer according to claim 1, wherein said electronic switch is connected for control by said control means and is connected so that an output voltage of said flow-through DC voltage changer is regulated to a constant value.

3. A flow-through DC voltage changer according to claim 1, further comprising:

a capacitor connected in series with the output of the flow-through DC voltage changer, a first terminal of said capacitor being connected to that terminal of said flow-through DC voltage changer output that carries voltage compared to a reference potential and a second terminal of said capacitor being conducted to that terminal of said second diode facing away from said rectifier diode.

4. A flow-through DC voltage changer according to claim 1, further comprising:

a capacitor having a first terminal connected to said reference potential and a second terminal conducted to that terminal of said second diode facing away from said rectifier diode at said output of said flow-through DC voltage changer.

5. A flow-through DC voltage changer according to claim 1, further comprising:

a transistor having a collector-emitter path of connected between said second diode and said output of said further output circuit; and a zener diode is connected between a base of said transistor and said reference potential.

6. A flow-through DC voltage changer according to claim 5, further comprising:

a resistor connected between the collector and the base of said transistor.

7. A flow-through DC voltage changer according to claim 1, wherein an output voltage of said flow-through DC voltage changer is lower than 5 volts and an auxiliary voltage amounts to at least 5 volts.

8. A flow-through DC voltage changer according to claim 1, further comprising:

an electrical circuit connected to said secondary circuit, the supply voltage input of said electrical circuit being connected to the output of the further output circuit.

9. A flow-through DC voltage changer according to claim 1, wherein said transformer has a core with an air gap.

10. A flow-through DC voltage changer as claimed in claim 1, wherein said electronic switch includes a field effect transistor and said capacitance is a capacitor connected across a drain-source path of said field effect transistor.

11. A flow-through DC voltage changer, comprising:

a transformer having a primary winding and a secondary winding;

means for demagnetizing said transformer, said means for demagnetizing including a capacitance connected to said transformer to provide demagnetization energy in combination with an inductance of said transformer;

a primary side main circuit connected to said primary winding of said transformer and having an input to receive an input voltage, said primary side main circuit including:

an electronic switch connected in series with said primary winding of said transformer;

a control means connected for controlling said electronic switch;

a secondary-side main circuit connected to said secondary winding of said transformer and having an output at which is available a first output voltage, said secondary side main circuit including:

a rectifier diode connected in a series arm, a freewheeling diode connected in a shunt arm, an inductor connected in a series arm and a capacitor lying parallel to the output, a further output circuit in addition to said secondary-side main circuit being connected to said secondary winding of said transformer and having a further output at which is available a second output voltage, said further output circuit including a first capacitor, a rectifier diode connected between said first capacitor and said secondary winding, and a capacitor arrangement connected in parallel to an output of said further output circuit and said further output circuit taking demagnetization energy from said transformer in a blocking phase of said flow-through DC voltage changer, said first capacitor of said further output circuit being connected to a junction of said secondary winding with said rectifier diode of said secondary-side main circuit; and in the further output circuit, a second diode polarized in a conducting direction with reference to a voltage across the first capacitor is connected between the connection of said rectifier diode to the capacitor on one hand and said output on another hand.

* * * * *